United States Patent [19]
van Overbruggen

[11] Patent Number: 6,116,470
[45] Date of Patent: Sep. 12, 2000

[54] ASSEMBLY COMPRISING A HOLDER AND A PACK FILLED WITH A POWDERED MATERIAL

[75] Inventor: Gerardus Johannes Justinus van Overbruggen, Vianen, Netherlands

[73] Assignee: Sara Lee/DE N.V., Utrecht, Netherlands

[21] Appl. No.: 09/394,537

[22] Filed: Sep. 10, 1999

[30] Foreign Application Priority Data

Sep. 10, 1998 [NL] Netherlands .......................... 1010053

[51] Int. Cl.$^7$ ...................................... B67D 5/38
[52] U.S. Cl. ....................... 222/158; 222/452; 222/454; 222/325
[58] Field of Search .................. 222/452, 454, 222/158, 425, 456, 325

[56] References Cited

U.S. PATENT DOCUMENTS

| | | |
|---|---|---|
| 4,261,483 | 4/1981 | Dutcher . |
| 5,352,466 | 10/1994 | Delonis . |
| 5,518,152 | 5/1996 | Burcham et al. .................. 222/452 |
| 5,544,752 | 8/1996 | Cox ..................................... 206/524.8 |

FOREIGN PATENT DOCUMENTS

| | | |
|---|---|---|
| 0036655 | 9/1981 | European Pat. Off. . |
| 2311 275 | 9/1997 | United Kingdom . |

*Primary Examiner*—Kevin Shaver
*Assistant Examiner*—Melvin A. Cartagena
*Attorney, Agent, or Firm*—Merchant & Gould P.C.

[57] ABSTRACT

The assembly comprises a holder and a pack filled with a granular material such as ground coffee, which is received in the holder. It comprises a first valve for closing and clearing a first dispensing opening in the pack, and the holder comprises a second valve for closing and clearing a second dispensing opening in the holder. The holder includes a dosing space. The first and second valve are detachably connected with each other, and in a first position of the first and second valve the first dispensing opening of the pack is closed by the first valve and the second dispensing opening of the holder is closed by the second valve, in a second position of the first and second valve the first dispensing opening of the pack is cleared and the second dispensing opening of the holder is closed by the second valve for filling the dosing space with the powder from the pack, and in a third position of the first and second valve the first valve closes the first dispensing opening of the pack and the second valve clears the second dispensing opening of the holder for dispensing from the assembly the powder contained in the dosing space.

10 Claims, 3 Drawing Sheets

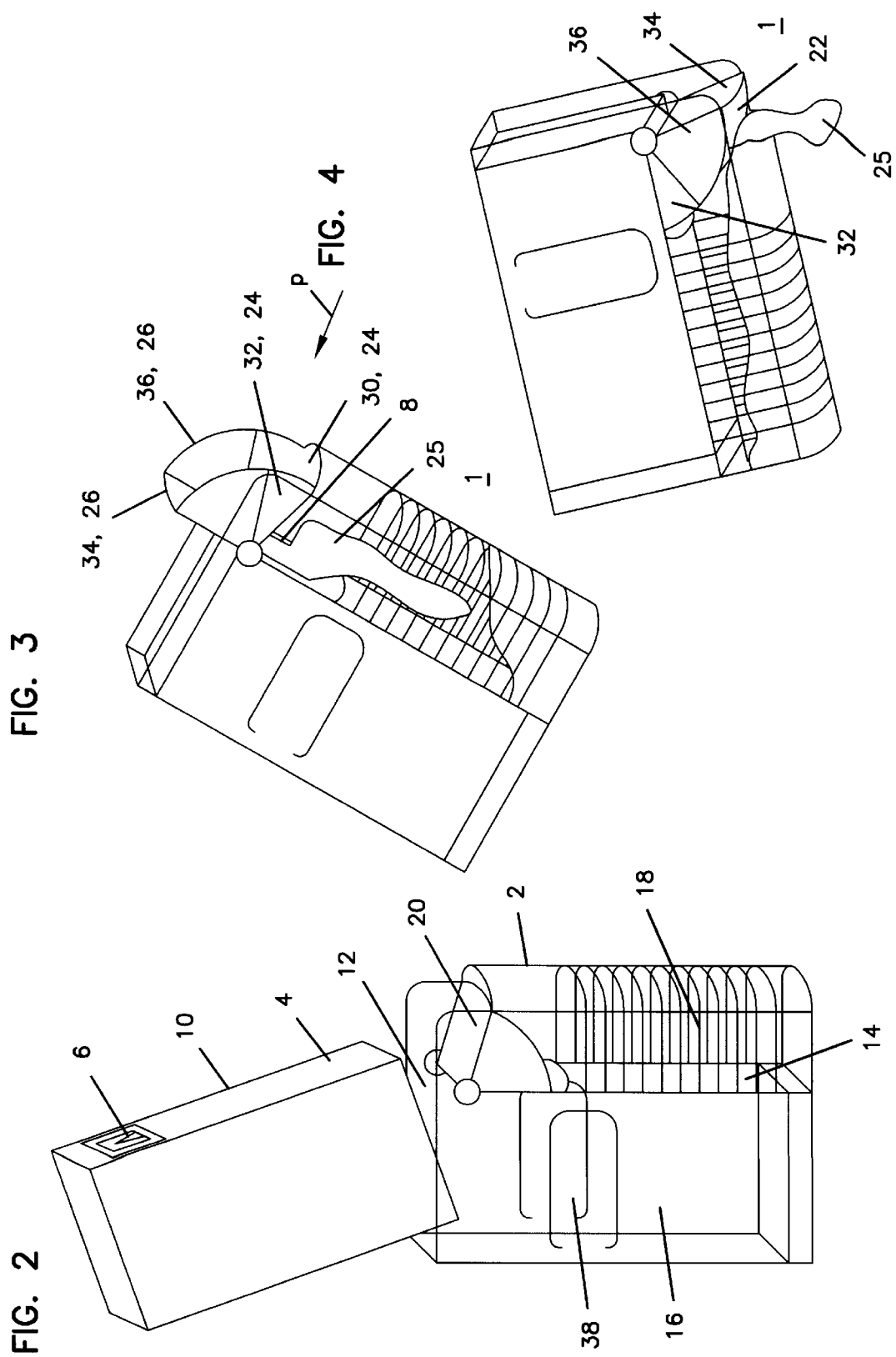

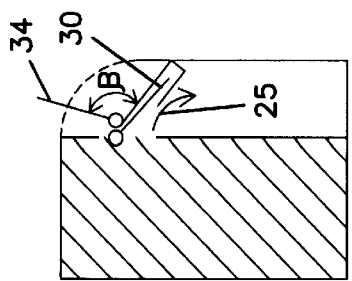
FIG. 6D
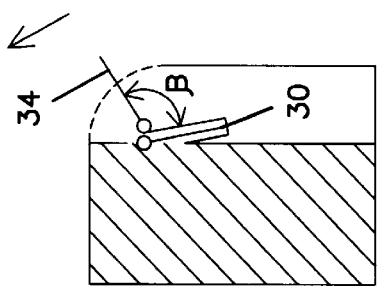
FIG. 6C
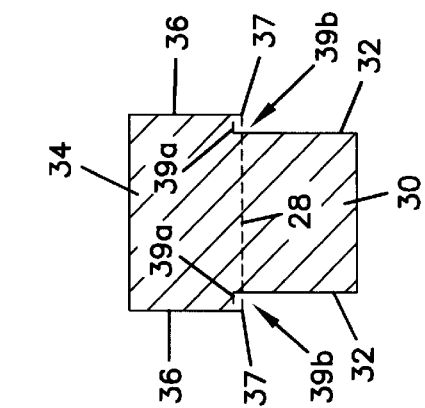
FIG. 5
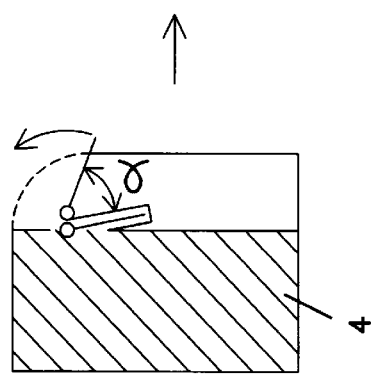
FIG. 6B
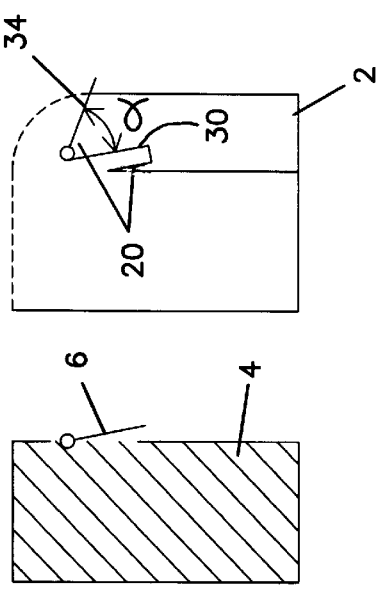
FIG. 6A
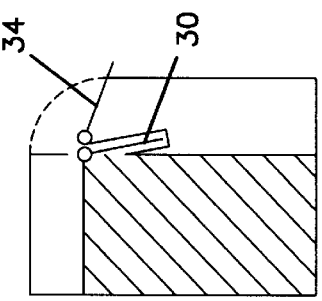
FIG. 6F
FIG. 6E

ASSEMBLY COMPRISING A HOLDER AND A PACK FILLED WITH A POWDERED MATERIAL

This invention relates to an assembly comprising a holder and a pack filled with a granular material such as ground coffee, which pack is removably received in the holder, the holder being made of a rigid material and the pack being made of a flexible sheetlike material.

Such an assembly is known per se. In the known assembly, the pack typically consists of a vacuum pack which is filled with ground coffee. This vacuum pack is cut open with scissors and then received in the holder. The holder typically consists of a round tin which can be closed with a cover. In use, the cover is opened, whereafter a user, with the aid of a scoop, can take ground coffee from the pack for preparing coffee. If desired, the pack can be taken from the holder to be re-placed in the holder after use. After the user has scooped ground coffee from the pack, the cover can be placed on the holder again.

A disadvantage of the known assembly is that quite often ground coffee is spilt while being scooped up, so that ground coffee is wasted. A further disadvantage is that the aroma of the coffee powder contained in the pack is at least partly lost, also when the holder is closed, in that the pack itself loses aroma to a space outside the pack but within the holder. When the cover is opened by a user, this aroma is lost immediately.

A further disadvantage is that it is not easy, with the aid of a scoop, to scoop ground coffee from the pack in an accurately dosed manner. Even when the scoop is designed as a graduated scoop, there is a measure of inaccuracy involved depending on the extent to which the graduated scoop is tilled up.

The object of the invention is to meet the disadvantages outlined and, accordingly, the invention is characterized in that the pack comprises a first valve for closing and clearing a first dispensing opening in the pack, the holder comprises a second valve for closing and clearing a second dispensing opening in the holder, the holder including a dosing space which, in use, can be filled with the granular material from the pack, the first and second valve being detachably connected with each other, and in a first position of the first and second valve the first dispensing opening of the pack is closed by the first valve and the second dispensing opening of the holder is closed by the second valve, in a second position of the first and second valve the first dispensing opening of the pack is cleared and the second dispensing opening of the holder is closed by the second valve for filling the dosing space with the granular material from the pack, and in a third position of the first and second valve the first valve closes the first dispensing opening of the pack and the second valve clears the second dispensing opening of the holder for dispensing from the assembly the granular material contained in the dosing space The assembly according to the invention is easy to open and close. For opening the pack, it is no longer necessary to cut it open using, for instance, scissors. Also, the pack is reclosable, so that the aroma of the granular material, such as ground coffee, contained in the pack is well preserved. By virtue of the dosing space, it is possible to remove material from the pack in an accurately dosed manner. Also, by virtue of the first dispensing opening terminating in the dosing space and the second dispensing opening in the holder, the granular material can easily be dispensed into, for instance, a filter holder, without spilling.

Preferably, the holder is made at least substantially from a transparent material. As a result, the pack contained in the holder is well visible from the outside.

The invention also relates to a holder of the assembly. The holder is preferably of refillable design. Accordingly, when a pack is empty, it can be taken from the holder, whereafter a new pack can be placed back in the holder. When placing the new pack in the holder, the first valve of the pack will automatically be connected with the second valve of the holder.

The invention further relates to a pack which is filled with a granular material such as ground coffee. According to the invention, the pack is made from flexible sheetlike material, the pack comprising a valve for closing and clearing a dispensing opening in the pack. Preferably, the valve is made of a rigid material.

The invention will presently be further explained with reference to the drawings. In the drawings:

FIG. 2 shows a holder and a pack of the assembly according to FIG. 1 before they are combined;

FIG. 3 shows the assembly according to FIG. 1, while in use a dosing space of the holder is filled with powdered material from the pack;

FIG. 4 shows the assembly according to FIG. 1, while in use powdered material contained in a dosing space is dispensed from the holder;

Figure 1:
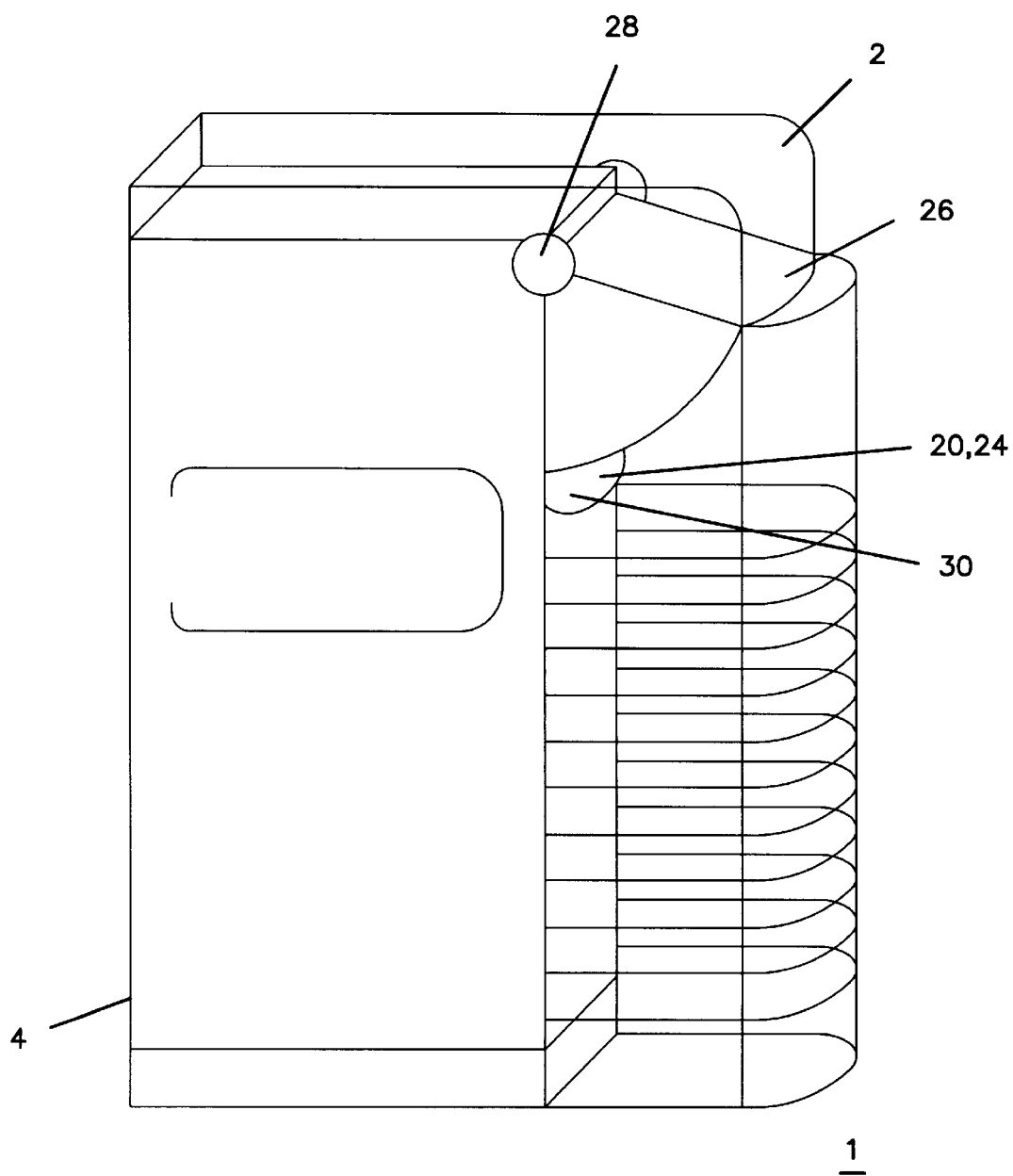
FIG. 1 shows a possible embodiment of the assembly according to the invention.

FIG. 5 schematically shows an elevation of the first and second valve in the direction of the arrow p in FIG. 3; and FIGS. 6a–6f schematically show the operation of the assembly according to FIGS. 1–5.

In FIGS. 1–4, reference numeral 1 designates an assembly according to the invention. The assembly comprises a holder 2 and a pack 4 filled with a powdered material, in this example ground coffee. In this example, the pack 4 is a vacuum pack. The holder 2 is made of a rigid material. The pack 4 is made of a flexible sheetlike material known per se, such as aluminum foil.

The pack 4 is suitable to be received in the holder, as shown in FIG. 1.

The pack 4 comprises a first valve 6 for closing and clearing a first dispensing opening 8 in the pack. The pack 4 in this example is of rectangular design. The first dispensing opening 8, and hence also the first valve 6, is provided in an upright sidewall 10 of the pack. The holder 2 too is of at least substantially rectangular design. An interior space 12 of the holder 2 is divided into two compartments 16, 18 by means of an upright sidewall 14. In use, the pack 4 can be received in the first compartment 16. In use, the second compartment 18 functions as dosing space. Adjacent an upper end of the holder 2, the holder comprises a second valve 20 for closing and clearing a second dispensing opening 22, which is provided in the holder 2.

The operation of the assembly is as follows.

The pack 4 filled with ground coffee is received in the first compartment 16 of the holder 2, as shown in FIG. 2. In this condition, the dispensing opening 8 of the pack is closed by the first valve 6. When the pack 4 has thus been received in the holder 2, as shown in FIG. 1, the first valve 6 of the pack 4 will be detachably connected with the second valve 20 of the holder 2 in a manner known per se. The connection between the first and the second valve can comprise, for instance, a groove-and-tongue construction. The second valve 20 in this example is made up of a first valve part 24 and a second valve part 26. As shown in FIG. 1, the first valve part 24 is mechanically connected with the first valve 6, for instance by means of the groove-and-tongue construction mentioned. In the condition of FIG. 1, the first and second valve are in a first position in which the first valve 6 closes the first dispensing opening 8 of the pack 4. Also, in the first position of the first and second valve shown in FIG. 1, the second valve part 26, and hence the second valve 20, closes the second dispensing opening 22.

The first valve part 24 and the second valve part 26 are each connected with the holder 2 for rotation about a rotation axis 28. The first valve part 24 consists of a first base bottom 30 which is connected with two opposite upright sidewalls 32 of the first valve part. The second valve part 26 consists of a second base bottom 34 which is connected with two opposite descending sidewalls 36 of the second valve part. In use, the upright sidewalls 32 and the descending sidewalls 36 can slide alongside each other. When a user moves the second base bottom 34 upwards from the position as shown in FIG. 1 by rotation of the rotation axis 28, the descending sidewalls 36 will slide along the upright sidewalls 32. Upon a further movement as shown in FIG. 3, a projecting part 37 of the descending sidewall 36 will interlock with projecting parts 39a and 39b of the upright sidewall 32 (see FIG. 5), with the result that the first valve part 24 too will start to rotate about the rotation axis 28. The projecting part 37 is thereby forced over the projecting part 39b, with the projecting part 39a blocking a further displacement of the first valve part relative to the second valve part. The first valve part 24 will thereby allow the first valve 6 to move along, with the result that the first dispensing opening 8 is opened. The result is that in a second position of the first and second valve 6, 20, as shown in FIG. 3, the first valve 6 clears the first dispensing opening 8, while moreover the base bottom 30 of the first valve part 24 closes the second dispensing opening 22. Presently, a user can shake coffee powder 25 from the pack, which automatically ends up in the dosing space 18.

Thereupon, a user can move the second valve part 26 down again (FIG. 4) by rotation of the rotation axis 28. As a result of this movement, both the first valve 6 and the first valve part 24 and the second valve part 26 will rotate about the rotation axis 28, because the first and second valve part 24, 26 are interlocked through the projecting part 39b and 37. In a third position of the first and second valve, as shown in FIG. 4, eventually the first valve 6 will close the first dispensing opening S. The second valve 20, however, will clear the second dispensing opening 22 because, as shown in FIG. 4, the base bottom 34 of the second valve part 26 is disposed above the second dispensing opening 22, whilst the base bottom 30 of the first valve part 24 engages the upright sidewall 10 of the pack 4. Presently, a user can dispense the coffee powder 25 contained in the dosing space 18 via the second dispensing opening 22 from the holder 2. Thereafter, a user can move the second valve part 26 further down, so that exclusively the second valve part will rotate around the rotation axis 28. The interlock between the first valve part and the second valve part will thereby be broken, in that the projecting part 37 is forced over the projecting part 39b. Eventually, the first and second valve 6, 20 resume the first position again as shown in FIG. 1.

Preferably, a sidewall of the dosing space 18 comprises a graduation. In the example, a holder is open at an upper end. However, this is not requisite. Preferably, the second valve 20 is arranged adjacent an upper end of a holder. Both the first and second valve 6, 20 are preferably made of a rigid material.

FIGS. 6a–6f once more show schematically the different positions of the first and second valve in the different stages of use of the assembly. In FIG. 6a the first valve S closes the pack 4, and the second valve 20, at least the second valve part 26 thereof, closes the holder 2. In FIG. 6b the pack 4, still closed, is placed in the holder 2, with the result that the first valve 6 is mechanically connected with the second valve 20. In FIG. 6c, the second base bottom 34 is moved upwards, so that the enclosed angle between the first base bottom 30 and the second base bottom 34 increases from $\alpha$ to $\beta$ in FIG. 6c. Upon reaching the value $\beta$ as shown in FIG. 6c, the projecting parts 37 and 39 hook behind each other, so that the magnitude of the enclosed angle cannot increase any further. Upon further upward movement of the second base bottom 34, the pack is opened, as shown in FIG. 6d. Also, in FIG. 6d, the second dispensing opening is closed by the first and second valve. Thereupon, as likewise shown in FIG. 6d, an amount of ground coffee 25 can be poured into the second compartment 18. Thereupon, the second base bottom 34 is moved down again. Because the first valve part 24 and the second valve part 26 are still interlocked, the enclosed angle between the first and second base bottom will, for the time being, remain equal to the value $\beta$, so that the first valve 6 will close the first dispensing opening, as shown in FIG. 6e. In this condition, the coffee powder 25 can be dispensed from the second compartment 18, as shown in FIG. 6e. After use, the second base bottom 34 can be pushed further down, with the result that the interlock between the first valve part 24 and the second valve part 26 is broken, so that the value of said enclosed angle decreases to $\alpha$, with the second base bottom 34 closing the second dispensing opening.

The invention is not in any way limited to the exemplary embodiment outlined hereinbefore. Thus, the device can be provided with sliding valves instead of rotary valves. Further, opposite sidewalls of the holder 2 can be provided with pressure means 38 (for instance parts of the sidewall of the holder bent towards the pack), in order to clamp the pack 4 when it is disposed in the compartment 16. This has as an advantage that the coffee powder contained in the pack is loosened, with the result that this coffee powder, in the condition of the holder and the pack shown in FIG. 3, can easily be dispensed from the pack to the dosing space. It is also conceivable that the pack is filled with other materials than ground coffee. To be considered here are, for instance, milk powder or tea. Such variants are all understood to fall within the scope of the invention.

What is claimed is:

1. An assembly comprising a holder and a pack filled with A granular material such as ground coffee, which pack is removably received in the holder, the holder being made of a rigid material and the pack being made of a flexible sheetlike material, characterized in that the pack comprises a first valve for closing and clearing a first dispensing opening in the pack, the holder comprises a second valve for closing and clearing a second dispensing opening in the holder, the holder including a dosing space which, in use, can be filled with the granular material from the pack, the first and second valve being detachably connected with each other, and in a first position of the first and second valve the first dispensing opening of the pack is closed by the first valve and the second dispensing opening of the holder is closed by the second valve, in a second position of the first and second valve the first dispensing opening of the pack is cleared and the second dispensing opening of the holder is closed by the second valve for filling the dosing space with the granular material from the pack, and in a third position of the first and second valve the first valve closes the first dispensing opening of the pack and the second valve clears the second dispensing opening of the holder for dispensing from the assembly the granular material contained in the dosing space.

2. An assembly according to claim 1, characterized in that the holder is made at least substantially from a transparent material.

3. An assembly according to claim 2, characterized in that a sidewall of the dosing space is provided with a graduation.

4. An assembly according to claim 1, characterized in that the pack and the holder are each of at least substantially rectangular design.

5. An assembly according to claim 4, characterized in that the holder is open at an upper end thereof.

6. An assembly according to claim 4, characterized in that the first valve is provided in an upright sidewall of the pack adjacent a top side of the pack.

7. An assembly according to claim 4, characterized in that the second valve is provided adjacent an upper end of the holder.

8. An assembly according to claim 1, characterized in that the pack consists of a vacuum pack.

9. An assembly according to claim 1, characterized in that the first valve is made of a rigid material.

10. An assembly according to claim 1, characterized in that the second valve is made of a rigid material.

* * * * *